United States Patent [19]
Prince

[11] Patent Number: 5,552,934
[45] Date of Patent: Sep. 3, 1996

[54] BACKGROUND REFLECTION-REDUCING PLANO-BEAM SPLITTER FOR USE IN REAL IMAGE PROJECTING SYSTEM

[75] Inventor: Jonathan Prince, New York, N.Y.

[73] Assignee: SPM Corporation, New York, N.Y.

[21] Appl. No.: 210,603

[22] Filed: Mar. 18, 1994

[51] Int. Cl.6 ................................................. G02B 27/14
[52] U.S. Cl. ........................ 359/629; 359/630; 359/631
[58] Field of Search ................................... 359/629, 630, 359/631, 618, 632, 49

[56] References Cited

U.S. PATENT DOCUMENTS

| | | |
|---|---|---|
| 922,722 | 5/1909 | Sallé. |
| 995,607 | 6/1911 | Kempinski . |
| 1,044,715 | 11/1912 | Wearn . |
| 1,699,689 | 1/1929 | Curry . |
| 2,112,314 | 3/1938 | Spandau . |
| 2,210,806 | 8/1940 | Etbauer . |
| 2,215,396 | 9/1940 | Hoyt . |
| 2,232,547 | 2/1941 | Mathias . |
| 2,285,509 | 6/1942 | Goshaw . |
| 2,576,147 | 11/1951 | Sauvage . |
| 2,628,533 | 2/1953 | Oetjen . |
| 2,679,188 | 5/1954 | Gould . |
| 2,975,415 | 3/1961 | Klasens . |
| 3,036,154 | 5/1962 | Harman . |
| 3,048,654 | 8/1962 | Schade, Sr. . |
| 3,096,389 | 7/1963 | Dudley . |
| 3,293,983 | 12/1966 | Gaudyn . |
| 3,317,206 | 5/1967 | Holt . |
| 3,508,809 | 4/1970 | Wilder et al. ............... 359/629 |
| 3,572,893 | 3/1971 | Bennett et al. .............. 359/462 |
| 3,632,108 | 1/1972 | Wilson ........................ 472/63 |
| 3,647,284 | 3/1972 | Elings et al. ............... 359/858 |

(List continued on next page.)

FOREIGN PATENT DOCUMENTS

| | | |
|---|---|---|
| 6362285 | 4/1993 | Australia . |
| 0309630 | 4/1989 | European Pat. Off. . |
| 0310721 | 4/1989 | European Pat. Off. . |
| 0363206 | 4/1990 | European Pat. Off. . |
| 0460873A1 | 12/1991 | European Pat. Off. . |
| 747917 | 3/1944 | Germany . |
| 1154711 | 9/1963 | Germany . |
| 55-45262 | 3/1980 | Japan . |
| 679342A5 | 1/1992 | Switzerland . |
| 1321303 | 6/1973 | United Kingdom . |
| 1543616 | 4/1979 | United Kingdom . |
| 2062281 | 5/1981 | United Kingdom . |
| 2072874 | 10/1981 | United Kingdom . |
| 2131645 | 6/1984 | United Kingdom . |
| 2134649 | 8/1984 | United Kingdom . |
| 2149090 | 6/1985 | United Kingdom . |
| 2177842 | 1/1987 | United Kingdom . |
| 83/03019 | 9/1983 | WIPO . |
| 89/09423 | 10/1989 | WIPO . |
| 90/05944 | 5/1990 | WIPO . |
| 93/12455 | 6/1993 | WIPO . |

*Primary Examiner*—Viet Q. Nguyen
*Assistant Examiner*—Vu A. Le
*Attorney, Agent, or Firm*—Kolisch, Hartwell, Dickinson McCormack & Heuser

[57] ABSTRACT

An improved plano-beam splitter for use in a real image projecting system is described. The treated planar expanse interposes a concave mirror positioned within an enclosure and an aperture provided in one wall of the enclosure acts to reflect the image of an illuminated object within the enclosure but out of sight of the aperture onto the concave mirror and to pass the image of the object reflected from the mirror toward the aperture and out of the enclosure to form a projected real image of the object in a space a determined distance in front of the aperture. The expanse is treated relatively to absorb or reflect light incident on it from the aperture, while relatively passing light incident on it from the mirror, thereby directionally differentially to provide clarity in a projected image uncluttered by reflected light entering the enclosure. Treating may be by tinting, coating, or other techniques, and may act to cause the expanse relatively to absorb and/or reflect light incident upon its front, or aperture-facing, surface.

6 Claims, 3 Drawing Sheets

U.S. PATENT DOCUMENTS

| | | | |
|---|---|---|---|
| 3,661,385 | 5/1972 | Schneider | 359/726 |
| 3,893,754 | 7/1975 | McInally | 359/858 |
| 4,073,569 | 2/1978 | Rizzo | 359/471 |
| 4,094,501 | 6/1978 | Burnett | 359/665 |
| 4,164,823 | 8/1979 | Marsico | 359/839 |
| 4,183,644 | 1/1980 | Tureck et al. | 359/629 |
| 4,210,928 | 7/1980 | Ohmori et al. | 348/746 |
| 4,229,761 | 10/1980 | Thomas | 348/40 |
| 4,232,968 | 11/1980 | Kempf | 359/479 |
| 4,239,342 | 12/1980 | Aurin et al. | |
| 4,281,353 | 7/1981 | Scarborough, Jr. | 359/858 |
| 4,283,115 | 8/1981 | Fraissl | 359/629 |
| 4,315,281 | 2/1982 | Fajans | 348/789 |
| 4,322,743 | 3/1982 | Rickert | 348/59 |
| 4,357,075 | 11/1982 | Hunter | 359/858 |
| 4,443,058 | 4/1984 | Bosserman | 359/613 |
| 4,491,872 | 1/1985 | Boldt et al. | 348/782 |
| 4,509,837 | 4/1985 | Kassies | 353/10 |
| 4,535,354 | 8/1985 | Rickert | 348/52 |
| 4,550,978 | 11/1985 | Freidle | 359/857 |
| 4,556,913 | 12/1985 | VanBreemen et al. | 348/782 |
| 4,571,041 | 2/1986 | Gaudyn | 353/10 |
| 4,623,223 | 11/1986 | Kempf | 359/472 |
| 4,647,966 | 3/1987 | Phillips et al. | 348/58 |
| 4,649,425 | 3/1987 | Pund | 437/60 |
| 4,671,625 | 6/1987 | Noble | 359/726 |
| 4,683,467 | 7/1987 | Macaulay et al. | 348/189 |
| 4,692,878 | 9/1987 | Ciongoli | 359/119 |
| 4,702,603 | 10/1987 | Augustyn | 359/487 |
| 4,756,601 | 7/1988 | Schröder | 359/472 |
| 4,776,118 | 10/1988 | Mizuno | 348/783 |
| 4,802,750 | 2/1989 | Welck | 359/858 |
| 4,805,895 | 2/1989 | Rogers | 472/58 |
| 4,840,455 | 6/1989 | Kempf | 359/471 |
| 4,927,238 | 5/1990 | Green et al. | 359/466 |
| 4,971,312 | 11/1990 | Weinreich | 359/631 |
| 4,995,719 | 2/1991 | Shanks | 353/112 |
| 5,004,331 | 4/1991 | Haseltine et al. | 445/35 |
| 5,036,512 | 7/1991 | Cloonan et al. | 359/112 |
| 5,065,116 | 11/1991 | Ueda et al. | 331/173 |
| 5,114,226 | 5/1992 | Goodwin et al. | 356/4.09 |
| 5,144,482 | 9/1992 | Gould | 359/478 |
| 5,148,310 | 9/1992 | Batchko | 359/479 |
| 5,172,266 | 12/1992 | Garcia et al. | 359/478 |
| 5,187,597 | 2/1993 | Kato et al. | 359/22 |
| 5,189,452 | 2/1993 | Hodson et al. | 359/630 |
| 5,257,130 | 10/1993 | Monroe | 359/478 |
| 5,408,346 | 4/1995 | Trissel et al. | 359/631 |

BACKGROUND REFLECTION-REDUCING PLANO-BEAM SPLITTER FOR USE IN REAL IMAGE PROJECTING SYSTEM

BACKGROUND OF THE INVENTION

The present invention relates to image projecting systems whereby an image of a stationary or mobile object within an enclosure is projected through an aperture into a space external to the enclosure for viewing. Such a system is described in Swiss Patent No. CH 679342 A5 entitled "Gerät zur Abblidung yon Objekten" to Sandro Del-Prete, which issued Jan. 31, 1992. More particularly, the invention concerns such a system including a curved mirror and an on-axis plano-beam splitter having reflective properties and having in addition unique directionally differential transmissive properties that reduce glare or other background reflection that otherwise would result in visual clutter of the projected real image, e.g. by the superimposition, thereon within the field of view of the real image that is projected from within the enclosure, of virtual images of objects that are external to the enclosure.

SUMMARY OF THE INVENTION

It is a principal object of this invention to provide, in an image projecting system including an image projecting concave mirror and an aperture, an improved plano-beam splitter by the use of which the virtual images of objects external to the system's enclosure do not superimpose on the real image projected through the aperture into a space external to the enclosure.

It is a further object of the invention to provide a plano-beam splitter having reflective properties and also directionally differential transmissive properties that permit the projected image to be transmitted outwardly from the concave mirror through the aperture but substantially to prevent an external object from being reflected off the concave mirror within a user's field of vision.

The invention briefly may be summarized as follows. Interposed a concave mirror positioned within an enclosure and an aperture provided in one wall of the enclosure is a plano-beam splitter tilted or oriented at an angle to an axis defined between the mirror and aperture. The beam splitter acts to reflect the image of an illuminated object within the enclosure but out of sight of the aperture onto the concave mirror. The concave mirror reflects the image along the axis and through the tilted beam splitter out of the enclosure through the aperture. A startlingly real image of the object is formed in space a determined distance in front of the aperture. When the real image is viewed from an angle such that the concave mirror is within the user's field of view through the enclosure's aperture, little or no reflected images of objects external to the enclosure, e.g. a viewer's reflection, are visible due to the directionally differential transmissivity properties of the invented beam splitter. Thus, there is no visual clutter or distraction from viewing the projected real image.

The plano-beam splitter may be made to exhibit directionally differential transmissivity by a variety of treatments including tinting, surface coating, striping, grating, etc. that are known in the optic arts. In one preferred embodiment vacuum-deposition of silicon oxide (SiO) on plate glass produces a bronze-colored beam splitter having approximately 40% reflectivity and 40% transmissivity (40—40) in both directions and having approximately 20% absorption of light passing therethrough from the aperture toward the concave mirror. Other coating techniques have used brushed aluminum (Al) having a reflective quality that reflects light entering the aperture and striking the outer surface of the beam splitter, while transmitting therethrough light that is projected from the concave mirror toward the aperture. It is believed that a beam splitter having 50–60 reflective-transmissive characteristics and approximately 20% opacity by tinting would produce excellent viewing of a projected real image without background reflection or other visual clutter.

These and additional objects and advantages of the present invention will be more readily understood after a consideration of the drawings and the detailed description of the preferred embodiment.

DETAILED DESCRIPTION OF THE INVENTION

Figure 1:
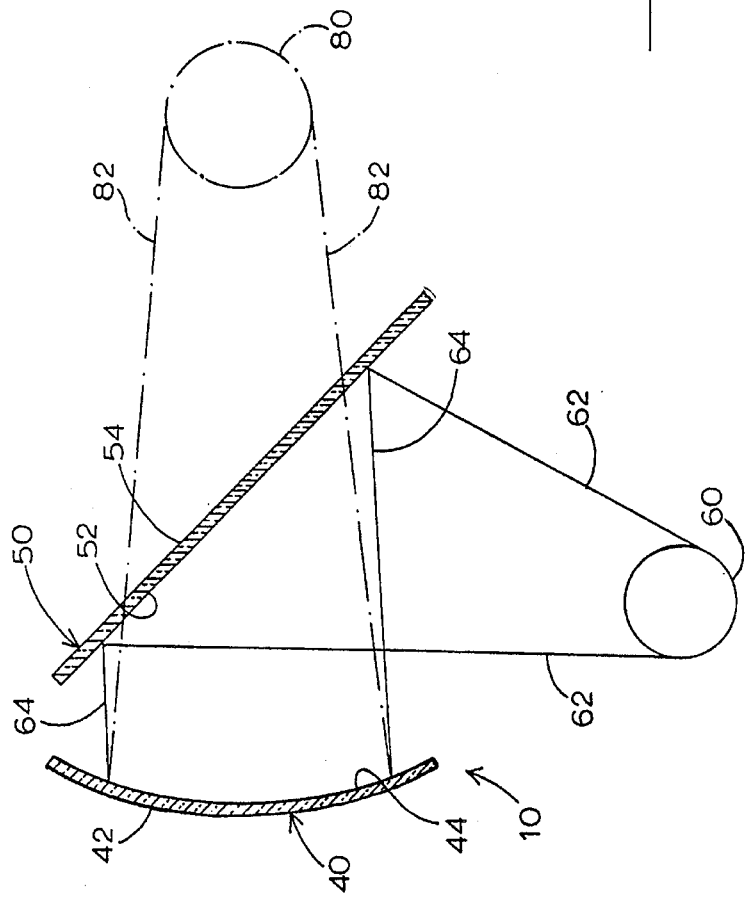
FIG. 1 is a schematic view of the path of a projected image according to the image projecting system of the present invention.

Referring first to FIG. 1, the image projection system of the present invention, generally indicated at 10, comprises a mirror 40, preferably a conical-shaped, concave mirror, having a rear surface 42 and a front surface 44. In order to reduce aberrations, the front surface 44 of the mirror 40 is characterized as a reflecting surface while the rear surface 42 is characterized as a mat surface. Thus, images do not travel into the mirror, but rather reflection of images occurs at the front surface 44 of the mirror 40.

Also included in the image projection system 10 shown in FIG. 1 is a beam splitter 50 having a rear surface 52 and a front surface 54. The beam splitter 50 could simply be a darkened piece of glass or any other material offering some, but not total, reflectivity. Importantly, the beam splitter 50 must be reflective, but not totally reflective, to permit an image to be reflected off the beam splitter 50 in one direction, but projected through the beam splitter 50 in another direction, as will be hereinafter explained. The beam splitter 50 should be shaded, so that the viewer will not see his or her reflection in the concave mirror 40 behind the beam splitter 50. Additionally, it is important for the beam splitter 50 to be shaded to prevent incoming light from entering the interior of the image projection system.

FIG. 1 shows the beam splitter 50 placed directly in front of and facing the mirror 40 and at an angle of approximately 45° to the place of the mirror. An object 60 whose image is to be projected is placed in line with the beam splitter 50 in a position perpendicular to an axis extending through the mirror 40 and beam splitter 50.

As can be seen in FIG. 1, the object 60 has an image that travels along rays 62 to the rear surface 52 of the beam splitter 50. The beam splitter 50 reflects the image towards the mirror 40 along rays 64. After the image from rays 64 contacts the front surface 44 of the mirror 40, the image is reflected along rays 82, through the beam splitter 50 to form a real image 80.

Figure 2:
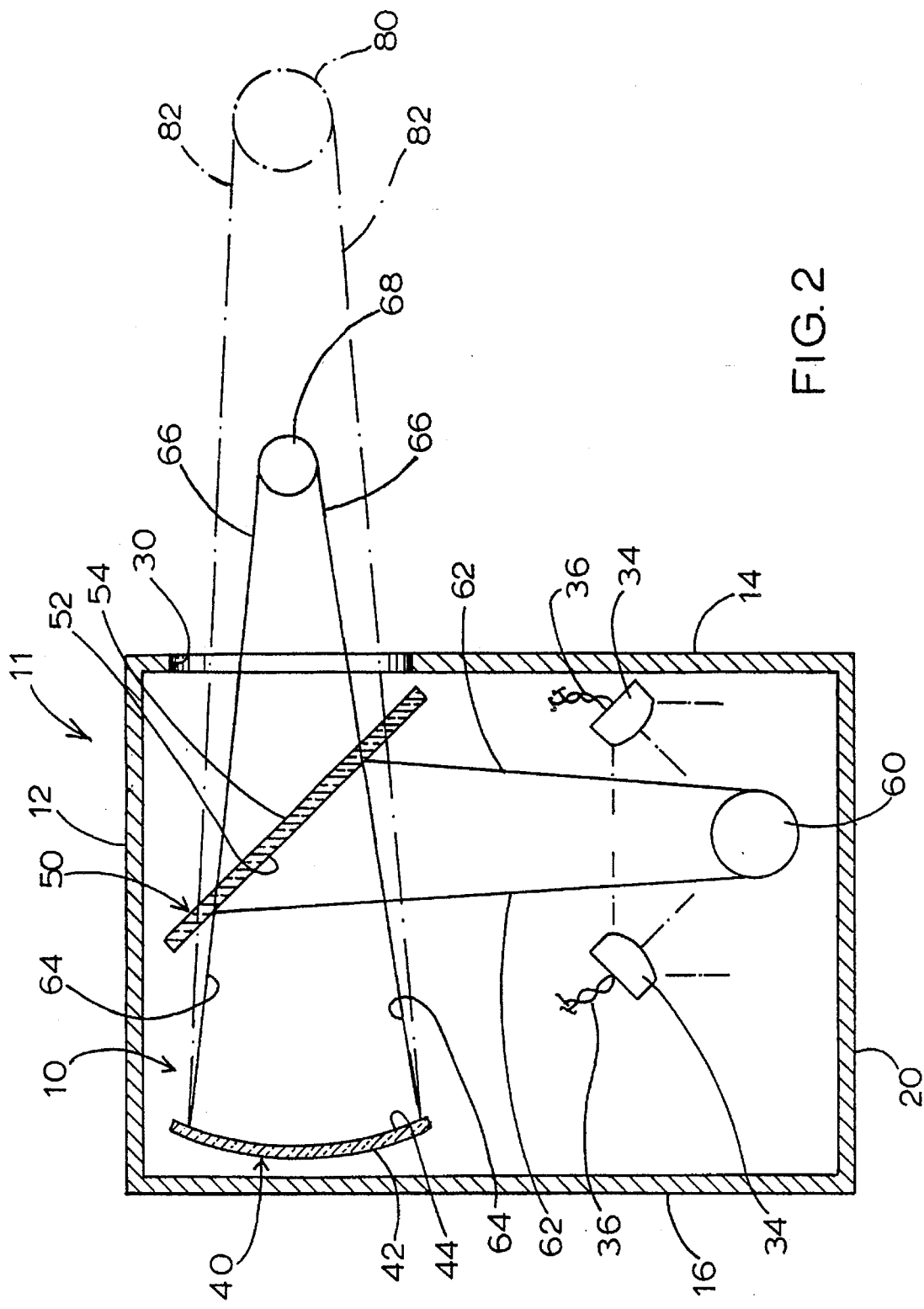
FIG. 2 is a cross-sectional view of image projecting system according the present invention.
Figure 3:
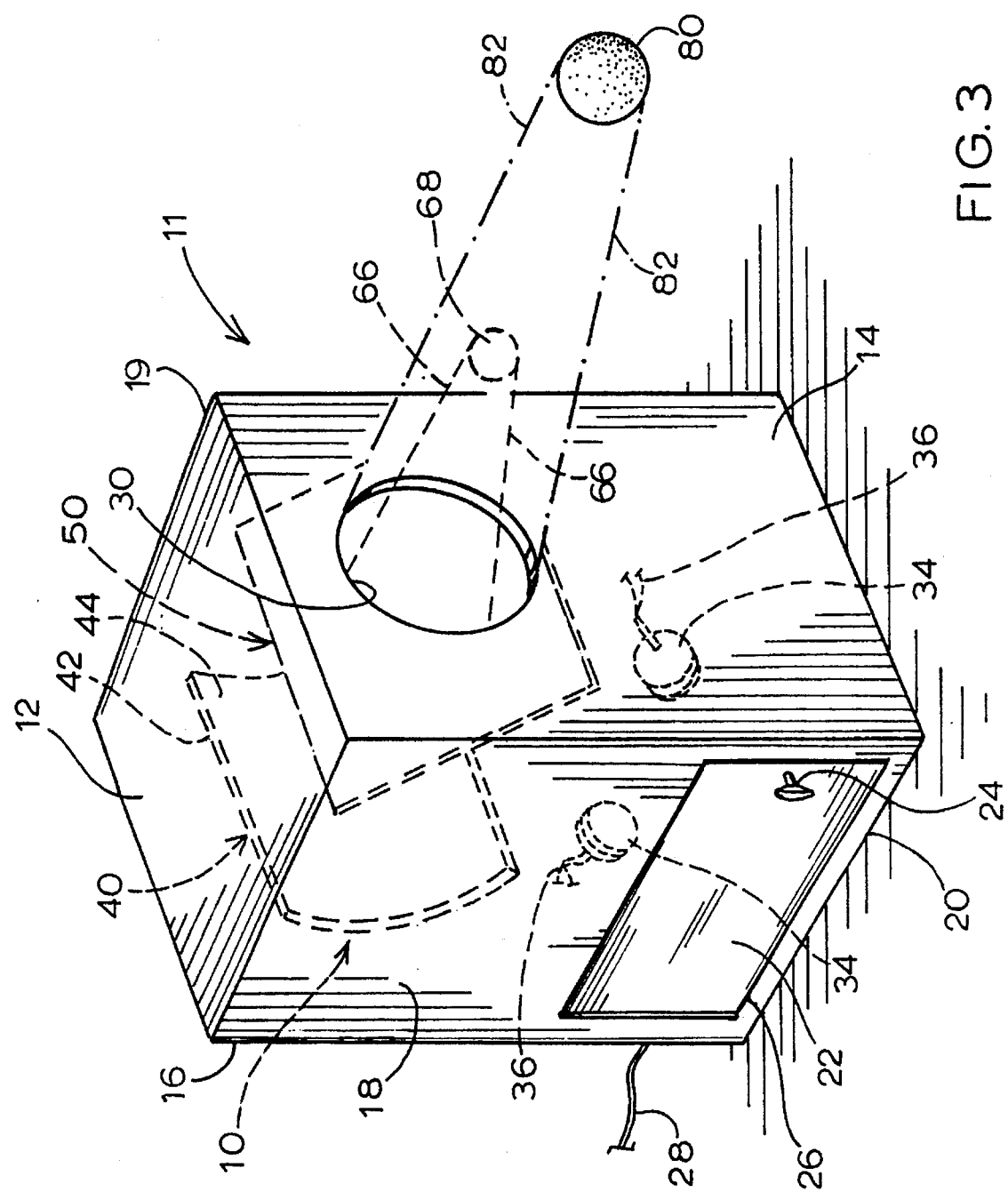
FIG. 3 is an isometric view of the image projecting system shown in FIG. 2.

The image projection system 10 of the present invention, can be used in an image projector, indicated generally at 11, in FIGS. 2 and 3. The image projector 11 includes housing or enclosure comprising a top side 12, a bottom side 20, a front side 14, a back side 16, and first and second sides 18 and 19. The front side 14 includes an aperture 30 for permitting an image to be projected from the projector 11.

The image projection system 10 as shown in FIG. 1 is contained within the image projector as shown in FIGS. 2 and 3. The image projection system comprises a conical mirror 40 and a beam splitter 50 placed in front of and facing the mirror at an angle of approximately 45° to the plane of the mirror. The mirror 40 and beam splitter 50, in the image projector 11, are arranged in line with aperture 30 to permit the images reflected by the mirror 40 to be projected from the image projector 11 through the aperture 30 along a projection axis A.

Typically, the image projector 11 is also provided with illumination means, or lights, 34 for illuminating the object 60. These lights 34 may be connected to power leads 36 which receive power from an outside power source via power cord 28 which leads from the image projector 11 to a power source (not shown). The illumination means 34 are not required, but help produce a better image of the object 60. Any illumination means, including natural illumination is within the scope of this invention. The lights 34 may be mounted within the projector 11 in any suitable manner and generally function best if positioned above the object 60. The lights 34 should be positioned in a manner so as not to interfere with the object 60 being projected and so as not to be seen from the exterior of the image projector 11. It should be noted that in some cases it may be desirable to move the lights 34 to follow a moving object or to rotate the lights 34 to obtain a desired effect.

In the image projector 11 of the present invention, object 60 is positioned directly below the beam splitter 50, perpendicular to axis A extending through the mirror 40 the beam splitter 50, and the aperture 30. The object 60 is received and supported within the projector 11 by a support or berth means not shown. The berth means may include rotational or turntable means for rotating the object to produce a moving real image.

The image of project 60 is directed upwards towards the beam splitter 50 along rays 62. Upon striking the rear surface 52 of beam splitter 50, the image is reflected back to the mirror 40 along rays 64. After hitting the front surface 44 of the mirror 40, the image is then reflected along rays 82, through the beam splitter 50, and through the aperture 30, to form a real image 80 in a space outside of the projector, at a determined distance in front of aperture 30.

It should be noted that the image projection system 10 and the image projector 11 are designed such that the image of the object 60 striking the beam splitter and reflecting towards the conical mirror produces a virtual object 68, the image of which moves along virtual rays 66 that extend toward and through the beam splitter 50 to the conical mirror 40. Because the object 60 is positioned at a right angle to the path of the rays 82 of the real image, the object 60 does not ever interfere with the view of the real image 80. This is dependent in part also upon the focal length of mirror 40, which must be long enough to permit the object to be distanced from beam splitter 50 out of view of the viewer.

It should also be pointed out that the object 60 may be moved or maneuvered or replaced as desired. This may be accomplished via door 22 in one of the sides of the projector 11 which may be opened to provide access to within the projector 11. The door typically may include a handle 24 for permitting one to grasp the door and hinges 26 which permit movement of the door. Any other means to permit replacing an object 60 within the projector 11 is within the scope of the invention.

Importantly, the real image 80 can be manipulated with respect to the object 60 in that it can be magnified or reduced depending upon the configuration of the image projection system 10. The preferred image magnification is from between 2:1 to 10:1. Typically, the further the image is projected, the larger the image will be. There is a point, typically at the radius of curvature of mirror 40, where the distance of the projection of the object is 1:1 with the distance of the projection of its real image, i.e. the real image object is projected out from the mirror a distance equal to the distance of the object from the mirror. If the object 60 is moved closer to or further from the beam splitter 50, the real image 80 will be projected closer in or further out and will change in size. Likewise, if the mirror 40 is moved closer to or further from the beam splitter 50, the size of the real image 80 will be altered. Also, as the object 60 is brought closer to the beam splitter 50, it is projected out further into space. Adjusting the radius of curvature will likewise vary the magnification of the object and the effective viewing area of the object both horizontally and vertically or azimuthally. It must be remembered, as discussed above, that changing the radius of curvature of mirror 40 changes the focal length and thus also might impact upon the visibility of object 60 to the viewer of real image 80.

The mirror may be formed of any desired material, such as polished metal, "silvered" metals, "silvered" materials that are transparent such as plastic or glass, or any other highly reflective surface. The types of curves are not important as long as they produce an image. Parabolic curves, spherical curves and ellipsoidal curves, and curves approximating these have proven to be highly satisfactory. Other curves are equally satisfactory, the only requirement being that the rays are focused to form an image.

Additionally, it should be noted that this invention can be used in a light simulator arrangement. As such, the object would be a CRT or LCD screen or a television monitor. Such self illuminating objects would not require the use of lights in the image projector. When the object is placed at the radius of curvature, it is projected at a 1:1 ratio. The monitor would be typically placed inside the focal length of the mirror. If the object is placed within the radius of curvature, the object is enlarged and projected forward infinitely.

The image projector 11, as shown and described herein, may be used in various settings. One particular application is advertising, where the image projector 11 could project an image of a product. As such, the image projector 11 could be built into a vending machine, and the real image 80 would then be projected Out of the machine to capture the attention of people. Likewise, all other applications of the image projector are within the scope of this invention.

It will be appreciated that a user of system 10 would desire to view real image 80 without background visual distraction. Yet, there is a necessarily reflective nature of curved mirror 40 within the housing, which potentially would reflect all light incident thereon including light entering the housing through aperture 30. Some of such reflected light would be visible to the user of system 10 and undesirably would superimpose itself on the user's desirably uncluttered view of real image 80. The present invention seeks to reduce such background or external object image reflection.

Figure 4:
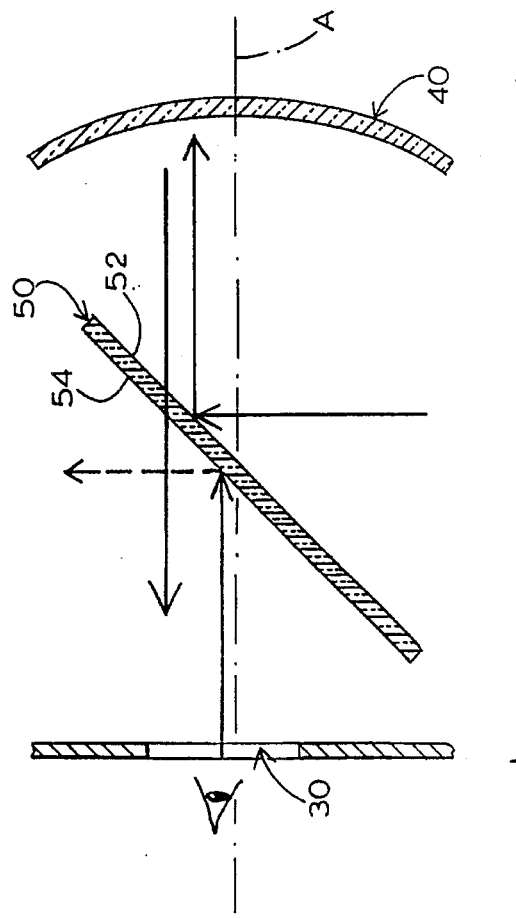
FIG. 4 is a schematic view of the invented absorptive plano-beam splitter component of the invented image projecting system.

Referring now to FIG. 4, the structure of the present invention in a preferred embodiment may be better understood. Plano-beam splitter 50 has unique optical properties that enable system 10 to project an enclosed object's real image into space such that it is highly visible without the background visual distractions that characterized prior art systems. The invention provides—for use in a real image projecting system 10 including a concave mirror 40 for reflecting a virtual image of an object and an aperture 30 through which is projected a real image of the object into space—a unique plano-beam splitter 50 interposed the mirror and the aperture.

As may be seen by reference to FIG. 4, plano-beam splitter 50 preferably includes a planar expanse having a front surface 54 facing aperture 30 and a rear surface 52 facing mirror 40, the plane of the expanse being oriented at a preferably approximately 45° angle to an axis A defined between the mirror and the aperture. The expanse in accordance with invention has a differential light transmissivity in either direction along axis A characterized by relatively high transmissivity of light (indicated in FIG. 4 by arrows) incident thereon from mirror 40 and relatively low transmissivity of light incident thereon from aperture 30. Those skilled in the art will appreciate that such directionally differential transmissivity effectively reduces reflected external object image visibility that would clutter a view of such a projected real image.

As briefly described above, the expanse—which may be medium-to-high optical quality plate glass—may be formed and/or treated in a number of ways to the desired effect. For example, the expanse may be is tinted or smoked, as is known in building window applications thereby to render it partly absorbent of light passing throughout. Such absorption is indicated in FIG. 4 by the termination of one of the arrows at the front surface 54 of beam splitter 50. Alternatively, the expanse may be coated on at least one of the front 54 and rear surfaces 52 thereof, as is known in vehicle windshield applications. The expanse may be grated to give it the desired semi-transmissive properties. The expanse may be striped, as is known. The expanse may be in effect a one-way mirror, as is known in surveillance applications, with the one-way mirrored coating substantially reflecting light striking the expanse's front, or aperture-facing, surface 54 and with the one-way mirrored coating substantially transmitting or passing light striking the expanse's rear, or mirror-facing, surface 52. Such reflection and transmission is indicated in FIG. 4 by dashed and solid arrows.

Those skilled in the art will appreciate that by the instant invention, there are myriad ways in which a plano-beam splitter may be rendered directionally differential in its transmissivity, e.g. by relatively increasing its absorption and/or reflectivity of light striking it on its aperture-facing front surface 54 such that most light entering aperture 30 fails to reach concave mirror 40. The beneficial effect is that there is little or no visible reflection from concave mirror 40 of light entering the housing or enclosure. Instead substantially all of the light that is projected from concave mirror 40 is light reflected from object 60 and turned onto concave mirror 40 by beam splitter 50. A practical real image projecting system 10 that does not suffer from the ill effects of background luminance and reflection of images of objects external to the enclosure results from the practice of the present invention. The projected real image 80 of object 60 is clear and undistracted.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. In a real image projecting system including a concave mirror for reflecting a virtual image of an object and an aperture through which is projected a real image of the object into space, a beam splitter interposed the mirror and the aperture comprising:

a planar expanse having a front surface facing the aperture and a rear surface facing the mirror, the plane of said expanse being oriented at an angle to an axis defined between the mirror and the aperture;

said expanse having differential light transmissivity in either direction along the axis characterized by relatively high transmissivity of light incident thereon from the mirror and relatively low transmissivity of light incident thereon from the aperture, thereby reducing reflected external object image visibility that would clutter view of such a projected real image.

2. The system of claim 1, wherein said expanse is tinted.

3. The system of claim 1, wherein said expanse is coated on at least one of the front and rear surfaces thereof.

4. The system of claim 1, wherein said expanse is grated.

5. The system of claim 1, wherein said expanse is striped.

6. The system of claim 1, wherein said expanse is one-way mirrored.

* * * * *